Sept. 14, 1954  J. N. LANERI  2,688,912
COOKING TIMING DEVICE
Filed May 24, 1950  2 Sheets-Sheet 1
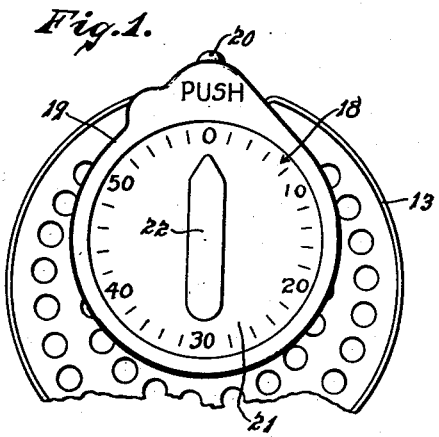
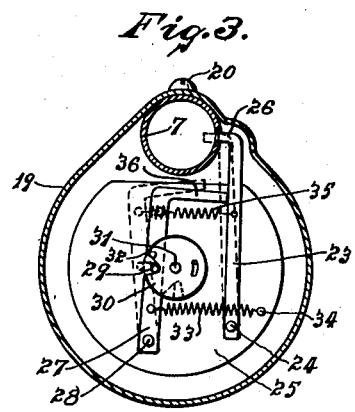
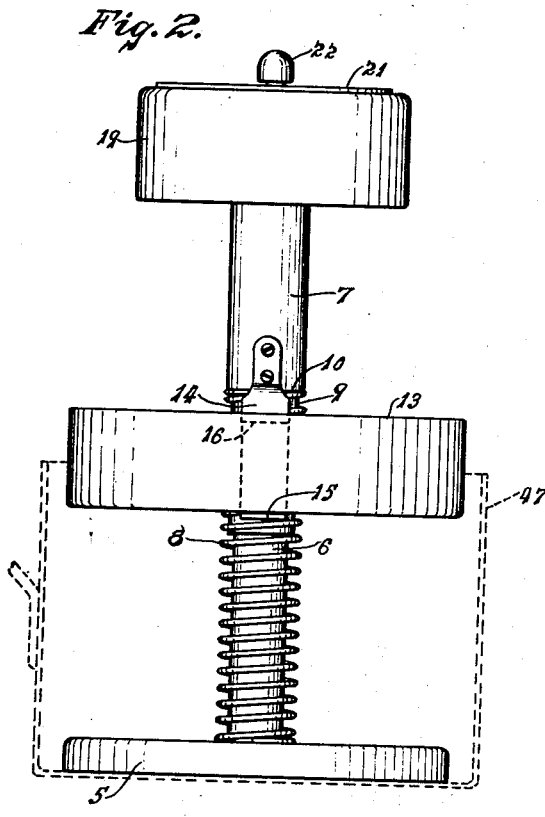
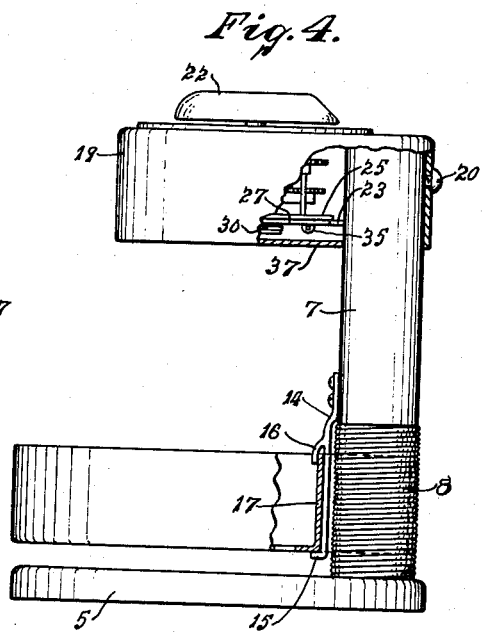
INVENTOR.
JAMES N. LANERI
BY
Louis V. Lucia
ATTORNEY.

Sept. 14, 1954

J. N. LANERI 2,688,912

COOKING TIMING DEVICE

Filed May 24, 1950

INVENTOR.
JAMES N. LANERI
BY
*Louis V. Lucia*
ATTORNEY.

Patented Sept. 14, 1954

2,688,912

UNITED STATES PATENT OFFICE 2,688,912

COOKING TIMING DEVICE

James N. Laneri, West Hartford, Conn.

Application May 24, 1950, Serial No. 163,944

4 Claims. (Cl. 99—336)

This invention relates to a cooking timing device and more particularly to a device for terminating an egg cooking operation at the expiration of a predetermined time interval.

An object of the present invention is to provide a device which may be used in a conventional container, or water boiler, and which will operate to raise the eggs out of the boiling water upon the expiration of a predetermined period of time during which the said eggs are permitted to remain in the water for a cooking operation.

A further object of the invention is to provide such a device which will support the eggs above the boiling water after the cooking operation and thereby permit them to be kept warm until they are needed for use.

A further object is to provide a simple and inexpensive device which will be highly efficient in its operation and easy to use.

A still further object is the provision of such a device which may be adjusted for varying the duration of the cooking operation so that the eggs may be cooked to a desired degree.

Further objects and advantages of the invention will be more clearly understood from the following description and from the accompanying drawings in which:

Fig. 1 is a plan view of an egg cooking device embodying my invention.

Fig. 2 is a front view thereof.

Fig. 3 is a sectional bottom view of the timing mechanism on line 3—3 of Fig. 5.

Fig. 4 is a side view of said device showing the same in cooking position.

Figure 5:
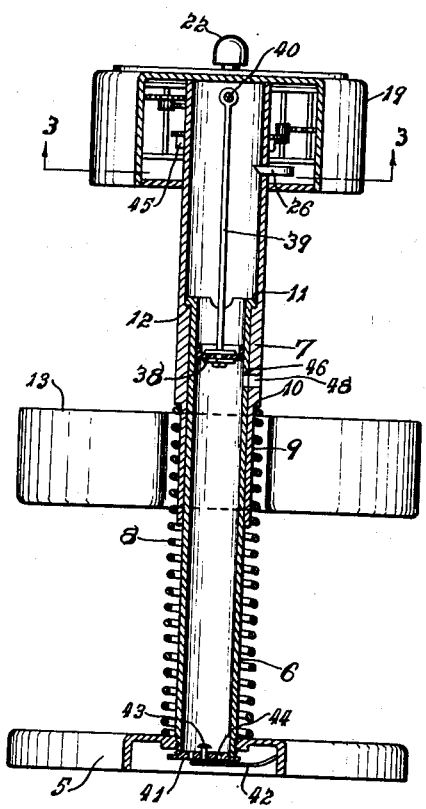
Fig. 5 is a sectional rear view of the device on line 5—5 of Fig. 4.
Figure 6:
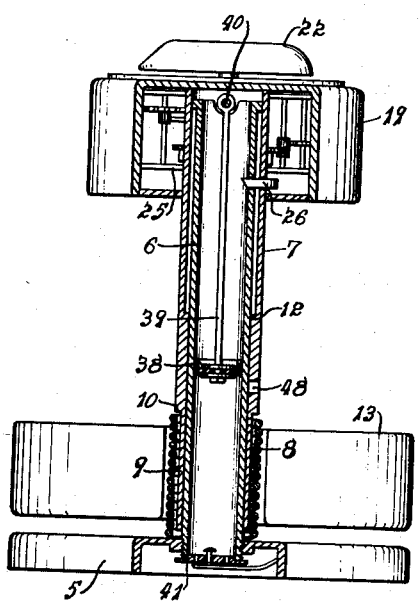
Fig. 6 is a similar view showing the device in cooking position.
Figure 7:
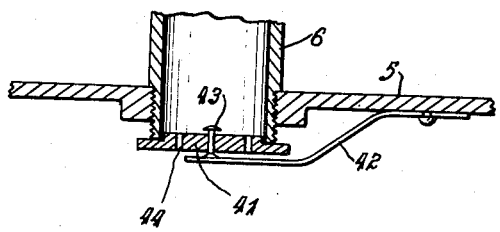
Fig. 7 is an enlarged sectional view of the dampening valve used in my invention.

In the embodiment of my invention which is illustrated in the drawings, my improved egg cooker comprises a base 5 upon which is mounted an upright tubular supporting post 6. A carrier 7, in the form of a tube, is slidable over the said post and is normally urged into its raised position by means of an elevating spring 8 which surrounds the said post and a reduced portion 9 of the carrier tube and is confined between the base and a shoulder 10 on the carrier. The raised position of said carrier is determined by an abutment shoulder which is provided by a flange 11 on the post 6, and abuts a cooperating shoulder 12 within the carrier tube 7.

A container 13, preferably in the form of a perforated basket, is detachably secured to the carrier 7 by means of a suitable bracket 14 which is secured to the said carrier and depends from the front thereof over a portion of the spring 8. The said bracket has a supporting lip 15 and a depending finger 16 and the container 13 is attached to said bracket by inserting the upper edge of the wall portion 17 under the said finger and placing the bottom portion of the container upon the lip 15.

In order to control the operation of said device, I provide, upon the top of the carrier 7, a suitable timing mechanism of conventional design, indicated at 18, which is contained within a casing 19 that is secured to the top of the carrier tube 7 by means of a fastening screw 20. This timing mechanism is preferably attached to the upper wall of the casing and has a dial 21, with suitable indicating indicia thereon, and a winding handle 22 for winding the timing mechanism to provide the desired time period for a cooking operation.

A detent lever 23 is pivotally mounted at 24, preferably upon the bottom plate 25 of the timing mechanism, and has a detent 26 at the end thereof which extends through an aperture in the side of the carrier tube 7.

The detent lever 23 is actuated by means of an operating lever 27 which is pivoted at 28, upon the bottom plate 25, and has a stud 29 thereon that engages the periphery of a camming and timing disk 30, such as commonly provided in conventional timing mechanisms of the type as herein employed. This disk usually comprises a pair of juxtapositioned disks which are mounted upon the timer shaft 31; one of said disks acting as a timing disk and being slightly larger than the other and rotatable to a limited extent upon the timer shaft, and the other disk acting as a camming disk. The timing disk has a narrow notch to permit entry of the pin 29 and the camming disk has a notch with a cam edge 32 which will force the pin outwardly, upon rotation of the disk by operation of the handle 22, and thereby move the operating lever 27 to its cocked position wherein the pin 29 will ride against the periphery of the timing disk as the said disks are rotated.

In order to operate the lever 27, I provide a spring 33 which is secured to said lever and anchored at 34 upon the plate 25. A separate spring 35 is provided between the detent lever 23 and the said operating lever 27 to normally urge the detent lever in the direction of and in contact with an abutment extension 36 on said operating lever.

The casing 19 is closed for the protection of the timing mechanism by means of a suitable cover plate 37.

My improved device is provided with a dampening mechanism for retarding the operation thereof and thereby providing for gently raising the eggs out of the water without a sudden jerk which could cause the eggs to be thrown from the container. This dampening mechanism includes a piston 38 which slides within the vertical tubular post 6 and is carried upon the end of a rod 39 that is secured adjacent the upper end of the carrier tube 7 by means of a cross pin 40. At the bottom of the post 6, there is provided a valve plate 41 which is yieldingly retained against the end of the tube by means of a spring bar 42 that is secured to the base 5 and to which the said plate 41 is moveably attached by means of a pin 43. The said valve plate is perforated, as at 44, to permit the operation of the dampening device as will be hereinafter described.

The operation of my improved timing device is as follows:

When it is desired to use the said device for timing the cooking of eggs or the like, the said eggs are first placed in the container 13 which is then hung upon the bracket 14 as above described. The timing mechanism may then be set for the time period which is desired to cook the eggs, by rotating the handle 22 to position the indicating point thereof with the corresponding indicia on the dial 21. This will rotate the camming and timing disk 30 and cause the camming disk to move the lever 27 to the position indicated in dotted lines in Fig. 3, wherein the pin 29 will ride upon the periphery of the timing disk, and also wind the mainspring of the timing mechanism, which is indicated at 45. As the lever 27 is forced rearwardly to the position shown in dotted lines, it will cause the spring 35 to pull the lever 23 and urge the detent 26 thereon inwardly through the opening in the side of the carrier tube 7, while the said operating lever is urged to maintain the pin 29 thereof in contact with the periphery of the camming disk 30 by means of the tension in the spring 33. The container 13 is then lowered to the position indicated in Fig. 4 by pushing downwardly on the casing 19 and the detent 26 will enter an opening 46 in the side of the tubular post 6, which will then be in register with the said detent, and retain the carrier and container thereon in lowered position against the tension of the elevating spring 8.

The entire device, with the eggs in the container thereof, is then placed in a suitable water boiler, or the like, such as indicated in dotted lines at 47, in which water is boiling at a level that is lower than the plane of the container 13 when in raised position. The device is then permitted to remain in the boiler with the eggs immersed in the boiling water therein for the cooking operation.

Upon the expiration of the predetermined period of time for which the timing mechanism was set, the notch on the timing disk will register with the pin 29. The said pin will then enter the notch and the spring 33 will force the extension 36 of the operating lever 27 against the detent lever 23 and cause the detent 26 to be withdrawn from the opening 46 in the tubular post 6. This will permit the elevating spring 8 to raise the carrier 7 to the position shown in Fig. 5 and thereby raise the eggs to a plane above the level of the boiling water so that the cooking operation will be terminated, but the eggs will remain in the steam issuing from the boiling water and be kept warm thereby until they are taken out for use.

As the carrier 7 is raised, at the termination of the cooking operation, the plunger 38 will draw some of the water from the boiler through the apertures 44 in the valve plate 41 and this will retard the upward movement of the carrier in proportion to the capacity of the said openings 44. The water which is drawn into the tubular post 6 is permitted to drain therefrom, through the openings 44, by means of a vent opening 48 in the side of the carrier 7 which will be in register with the opening 46 in the said post, as illustrated in Fig. 5, when the carrier is in its raised position.

It will be noted that, when the carrier is quickly forced downwardly into its lowered position, the spring 42 will yield and permit the valve plate 41 to unseat and release the air or water from within the tubular post 6.

I claim:

1. A timing device adapted to be placed into a container having water therein up to a certain level, the said device comprising a base, an upright tubular post mounted on said base, a carrier member vertically slidable on the said post and adapted to be moved from a lowered position on a plane below said level to a raised position on a plane above the said level, a bracket depending from said carrier; a perforated container mounted on said bracket, an elevating spring surrounding said post and normally urging the carrier towards its raised position, a detent for securing the carrier to the post to retain it in its lowered position against the tension of the said elevating spring, a timing mechanism for operating said detent at the expiration of a predetermined period of time to release the carrier and permit the perforated container to be moved to its raised position, a piston moveable with said carrier and slidable within the said tubular post, a valve plate yieldingly positioned against the bottom of said post, the said valve plate having perforations therein to control the entry of water into the interior of said post during the operation of the piston and thereby retard the movement of the carrier towards its raised position, a vent opening in said post, and a separate vent opening in the carrier registrable with the vent opening in the post when the carrier is in its raised position to vent the interior of the post and permit draining of water remaining therein through the openings in the valve plate.

2. A timing device for timing an egg cooking operation comprising a base, an upright tubular post secured on said base, a tubular carrier slidable over the tubular post, abutments between the post and carrier for limiting the movement of the carrier to its raised position, an elevating spring surrounding the post and a portion of the carrier for moving the carrier to its raised position, an egg container detachably mounted upon said carrier, a timing mechanism secured to the upper end of the carrier, a detent operable by said mechanism and projecting through the wall of the carrier, an abutment on the post engageable by said detent to retain the carrier in its lowered position against the tension of the elevating spring, a piston moveable with the carrier and slidable within the post for retarding the movement of the carrier under the influence of the said spring, a valve plate yieldingly seated against the bottom of the tubular post and having openings therein of predetermined capacity to control the entry of water into said post upon the movement of the piston therein for retarding the upward movement of the carrier to a predetermined degree, and vent means in said carrier communicable with the interior of the post when the carrier is in its raised position to permit water within said post to drain therefrom through the openings in the valve plate.

3. A timing device for timing a cooking operation comprising a base, an upright post on said base, a carrier vertically slidable on said post, a container for articles to be cooked secured to said carrier, spring means normally urging the carrier towards raised position, an abutment on said post for limiting the upward movement of the carrier on the post, a timing mechanism secured to said carrier, a detent lever having a detent extending through said carrier and engageable with an abutment on the post for retaining the carrier in its lowered position against the tension of the elevating spring, an operating lever for operating the detent lever, a spring member urging said operating lever to move the detent lever to cause the detent thereon to release the carrier from the post, a spring member between the operating lever and the detent lever for urging the detent on the said detent lever into engagement with the abutment on the post when the operating lever is in its cocked position during the operation of the timing mechanism, and means rotatable in said timing mechanism for releasing the operating lever from its cocked position and causing operation of the detent lever to permit the carrier to be moved to its raised position upon the expiration of a predetermined period of time.

4. A timing device for timing an egg cooking operation comprising a base, an upright tubular post secured on said base, a tubular carrier slidable over the tubular post, abutment means for limiting the movement of the carrier relatively to the post, an elevating spring surrounding the post and abutting the carrier for moving the carrier to its raised position, a container detachably mounted upon said carrier, a timing mechanism, a detent operable by said timing mechanism, an abutment on the post engageable by said detent to retain the carrier in its lowered position against the tension of the elevating spring, a piston moveable with the carrier and slidable within the said post for retarding the movement of the carrier under the influence of the elevating spring, a valve plate yielding seated against the bottom of the tubular post and having openings therein of predetermined capacity to control the entry of fluid into said post for retarding the upward movement of the carrier to a predetermined degree, and vent means in said carrier adapted to open when the carrier is in its raised position to permit fluid from within said post to drain therefrom through the openings in the valve plate.

References Cited in the file of this patent

UNITED STATES PATENTS

| Number | Name | Date |
| --- | --- | --- |
| 550,908 | Chevalie | Dec. 3, 1895 |
| 1,149,590 | Moe | Aug. 10, 1915 |
| 1,161,618 | Coes | Nov. 23, 1915 |
| 1,377,983 | Lamb | May 1, 1921 |
| 1,623,093 | Chapin et al. | Apr. 5, 1927 |
| 1,876,072 | Noonan | Sept. 6, 1932 |
| 2,196,968 | Beimis | Aug. 16, 1940 |
| 2,266,301 | Biebel | Dec. 16, 1941 |
| 2,393,559 | Pappas | Jan. 22, 1946 |
| 2,477,805 | Hummel | Aug. 2, 1949 |
| 2,592,024 | Goodroad et al. | Apr. 8, 1952 |

FOREIGN PATENTS

| Number | Country | Date |
| --- | --- | --- |
| 57,942 | Switzerland | Oct. 14, 1911 |
| 92,962 | Germany | July 26, 1897 |
| 384,659 | France | Feb. 10, 1908 |
| 594,469 | Germany | Mar. 17, 1934 |
| 738,932 | France | Oct. 24, 1932 |